United States Patent [19]
Hicok et al.

[11] Patent Number: 5,634,069
[45] Date of Patent: May 27, 1997

[54] ENCODING ASSERTION AND DE-ASSERTION OF INTERRUPT REQUESTS AND DMA REQUESTS IN A SERIAL BUS I/O SYSTEM

[75] Inventors: Gary D. Hicok, Mesa; David R. Evoy, Tempe; Gary A. Walker, Phoenix; Joseph A. Thomsen, Chandler; Lonnie C. Goff, Tempe; Bruce E. Cairns, Scottsdale, all of Ariz.

[73] Assignee: VLSI Technology, Inc., San Jose, Calif.

[21] Appl. No.: 503,795

[22] Filed: Jul. 18, 1995

Related U.S. Application Data

[63] Continuation-in-part of Ser. No. 187,960, Jan. 28, 1994, Pat. No. 5,475,854.

[51] Int. Cl.$^6$ .................................................. G06F 13/14
[52] U.S. Cl. ...................... 395/800; 395/500; 395/842; 395/733
[58] Field of Search ...................... 395/800, 733, 395/842, 821, 500, 868

[56] References Cited

U.S. PATENT DOCUMENTS

| | | | |
|---|---|---|---|
| 4,358,825 | 11/1982 | Kyu et al. | 395/325 |
| 5,142,628 | 8/1992 | Okochi et al. | 395/325 |
| 5,305,441 | 4/1994 | Okochi et al. | 395/325 |
| 5,390,350 | 2/1995 | Chung et al. | 395/150 |
| 5,404,460 | 4/1995 | Thomsen et al. | 395/225 |
| 5,475,854 | 12/1995 | Thomsen et al. | 395/800 |

Primary Examiner—Mehmet B. Geckil
Attorney, Agent, or Firm—Douglas L. Weller

[57] ABSTRACT

A computing system encodes and emulates requests signals, such as DMA requests or interrupt requests. A first peripheral device is connected to a first request pin of a first input/output (I/O) device. When the first peripheral device asserts a first request signal on the first request pin, a serializer within the first I/O device generates a first packet. The serializer forwards the first packet to a serial out port of the first I/O device. The first packet identifies the type of request and the direction of the edge transition. The serial out port forwards the first packet to a serial in port of a controller device. Upon the serial in port receiving the first packet, an unserializer within the controller device asserts an emulated first request signal, the emulated first request signal being coupled to a first request controller within the controller device. When the first peripheral device de-asserts the first request signal on the first request pin of the first I/O device, the serializer generates a second packet. The second packet identifies the type of request and the direction of the edge transition. The serializer forwards the second packet to the serial out port of the first I/O device. The serial out port of the first I/O device forwards the second packet to the serial in port of the controller device. Upon the serial in port receiving the second packet, the unserializer within the request controller de-asserts the emulated first request signal. When the first peripheral device pulses the first request signal by quickly de-asserting and asserting the first request signal in quick succession, the second packet is sent, but not the first packet.

16 Claims, 7 Drawing Sheets

ENCODING ASSERTION AND DE-ASSERTION OF INTERRUPT REQUESTS AND DMA REQUESTS IN A SERIAL BUS I/O SYSTEM

CROSS REFERENCE TO RELATED APPLICATION

This application is a continuation-in-part of application Ser. No. 08/187,960, filed Jan. 28, 1994, now U.S. Pat. No. 5,475,854.

BACKGROUND

The present invention generally relates to electronic input/output (I/O) systems and methods, and, more specifically, relates to a serial bus I/O system and method for serializing interrupt (INT) requests and direct memory access (DMA) requests in a computer system.

The trend in electronic systems is towards miniaturization, as shown by the success in the marketplace of laptop and notebook computers, and hand-held video games. As the size of electronic systems shrinks, the pin count on their components becomes a significant limiting factor in further decreasing the size of the end product. Many systems are conserving pins by taking certain functions that used to occur in parallel format, and implementing these functions instead in a serial format. Electronic systems that have components that communicate via a serial bus are well-known in the prior art. In this manner a parallel data transfer that used to take eight data bits and a control bit for handshaking (nine bits total) can be implemented in serial format, which requires only two pins, one for serial data and another for the control bit. One specific example of reducing pin count by serializing functions previously accomplished in parallel is found in the VL82C480 chip set by VLSI Technology, Inc. To minimize the number of pins required to support a traditional ISA bus, the VL82C480 put the direct memory access (DMA) Request (DRQ) and Interrupt Request (IRQ) inputs that service the ISA bus into a parallel to serial converter, and used the resulting serial stream to determine the state of the DRQ and IRQ inputs. This serial stream had a dedicated bit for each DRQ and IRQ input, making for a large serial packet. In essence, the serial stream provides a series of snapshot of the state of all the pins in the system.

This method of serialization of DRQs and IRQs introduces latency to these signals due to the time required to serialize the data, the time required to shift out this large serial packet, and the time required to convert this serial data back to parallel format. For the case of a DMA Request, excessive latency could result in the DRQ input being asserted after the service of the DMA is no longer required, resulting in overflowing or underflowing the DMA data transfer. For the case of an Interrupt Request, excessive latency could cause the IRQ input to be asserted when an interrupt is no longer present, resulting in the CPU servicing the Interrupt Request needlessly. For these reasons the latency of the serial stream is critical and must be minimized. Therefore, there existed a need to provide a serial bus I/O system and method for serializing interrupt requests and DMA requests and which provides minimum latency for the signals on the serial bus. There also existed a need to be able to place multiple devices on such a serial bus.

SUMMARY OF THE INVENTION

In accordance with the preferred embodiment of the present invention, a computing system which encodes and emulates requests signals, such as DMA requests or interrupt requests, is provided. This is done by sending a dedicated packet over a serial bus whenever a positive edge or a negative edge of a request signal is detected.

More specifically, a first peripheral device is connected to a first request pin of a first input/output (I/O) device. When the first peripheral device asserts a first request signal on the first request pin, a serializer within the first I/O device generates a first packet. The serializer forwards the first packet to a serial out port of the first I/O device. The first packet identifies the type of request and the direction of the edge transition.

The serial out port forwards the first packet to a serial in port of a controller device. Upon the serial in port receiving the first packet, an unserializer within the controller device asserts an emulated first request signal, the emulated first request signal being coupled to a first request controller within the controller device.

When the first peripheral device de-asserts the first request signal on the first request pin of the first I/O device, the serializer generates a second packet. The second packet identifies the type of request and the direction of the edge transition. The serializer forwards the second packet to the serial out port of the first I/O device. The serial out port of the first I/O device forwards the second packet to the serial in port of the controller device. Upon the serial in port receiving the second packet, the unserializer within the request controller de-asserts the emulated first request signal.

When the first peripheral device pulses the first request signal by quickly de-asserting and asserting the first request signal in quick succession, the second packet is sent, but not the first packet.

There may be more than one request pin connected between an I/O device and a peripheral. For example, the first request pin may be for DMA requests and a second request pin may be for interrupt requests. For each transition of either request signal, a packet is generated which identifies the type of request and the direction of the edge transition.

The present invention is useful in systems in which I/O devices are daisy chained by a serial bus composed of serial bus connections connected between the I/O devices and the controller device. For example, when a second peripheral device asserts a second request signal on a second request pin of a second I/O device, a serializer within the second I/O device generates a third packet. The serializer forwards the third packet to a serial out port of the second I/O device. The serial out port of the second I/O device forwards the third packet to the first I/O device which passes the third packet to the serial in port of the controller device. Upon the serial in port of the controller device receiving the third packet, the unserializer within the request controller asserts an emulated second request signal. The emulated second request signal is coupled to the request controller within the controller device.

Likewise, when the second peripheral device de-asserts the second request signal on the second request pin of the second I/O device, the serializer within the second I/O device generates a fourth packet. The serializer forwards the fourth packet to the serial out port of the second I/O device. The serial out port of the second I/O device forwards the fourth packet to the first I/O device which in turn forwards the fourth packet to the serial in port of the controller device. Upon the serial in port of the controller device receiving the fourth packet the unserializer within the request controller de-asserts the emulated second request signal.

The present invention allows for a serial bus transmitter to detect rising and falling edges of interrupt request signals and DMA request signals without losing signal information due to the latency introduced by prior systems. This allows a full and timely emulation of the signals at the appropriate controller.

DESCRIPTION OF THE PREFERRED EMBODIMENT

Figure 1:
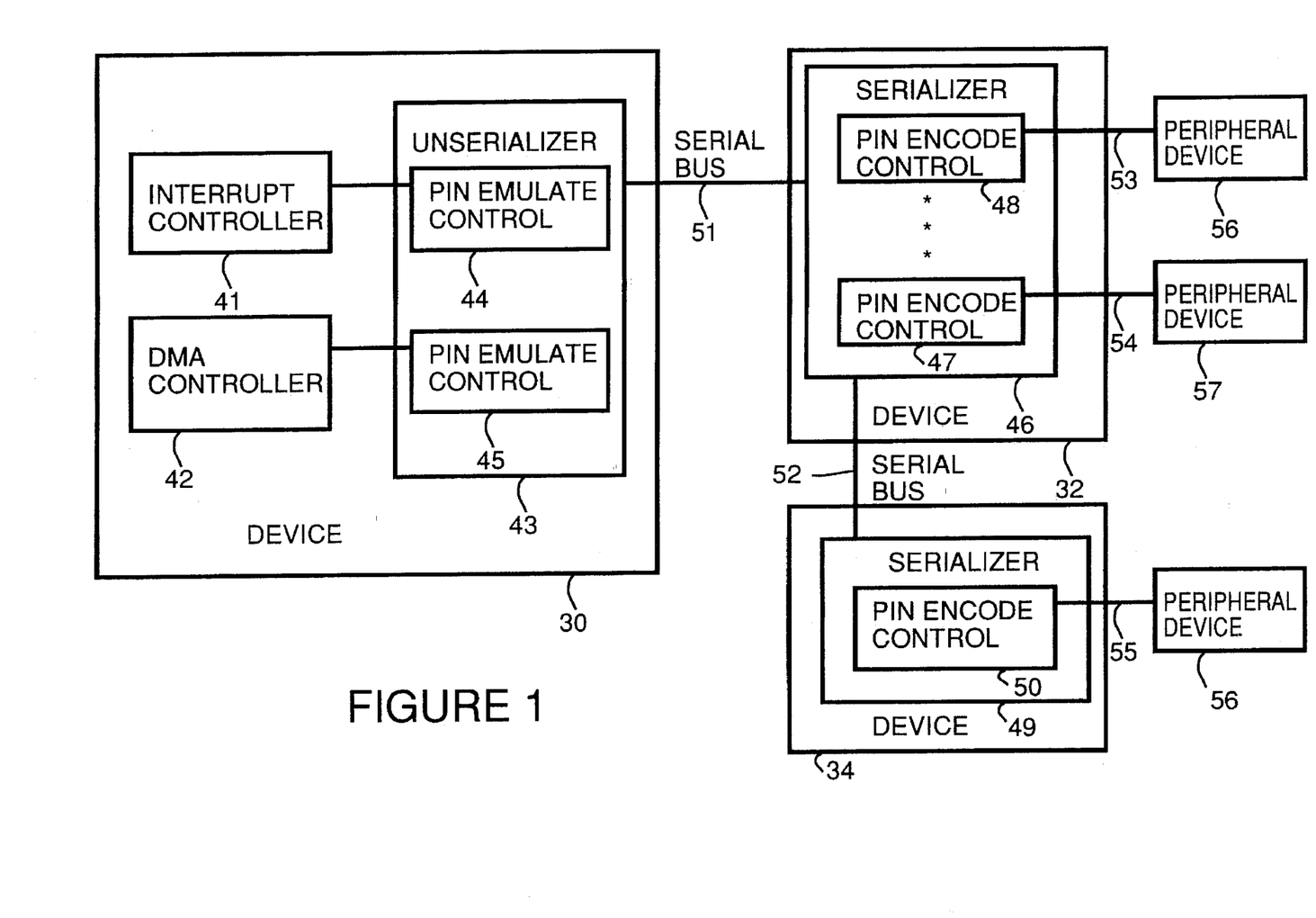
FIG. 1 shows a simplified block diagram of a system in which the rising and falling edges of signals on request pins are detected and serialized in accordance with a preferred embodiment of the present invention.

FIG. 1 shows a simplified block diagram of a system in which the rising and falling edges of interrupt signals are detected and serialized in accordance with a preferred embodiment of the present invention. In FIG. 1, a device 34 is connected through a serial bus connection 52 to a device 32. Device 32 is likewise connected to a device 30 through a serial bus connection 51. The signal placed on a request pin 55 by a peripheral device 58 is encoded by a pin encode control 50 within a serializer 50. For example, the signal on request pin 55 is an interrupt request or a DMA request. For each transition of the signal on request pin 55, serializer 49 sends a packet with the edge information through serial bus connection 52 to device 32. Device 32 sends the packet through 51 on to device 30. Device 34 may have other request pins, the signals on which are encoded by additional pin encode controls.

The signal placed on a request pin 54 by a peripheral device 57 is encoded by a pin encode control 47 within a serializer 46. For example, the signal on request pin 54 is an interrupt request or a DMA request. For each transition of the signal on request pin 54, serializer 46 sends a packet with the edge information through serial bus connection 51 to device 30. The signal placed on a request pin 53 by a peripheral device 58 is encoded by a pin encode control 48 within serializer 46. For example, the signal on request pin 53 is an interrupt request or a DMA request. For each transition of the signal on request pin 53, serializer 46 sends a packet with the edge information through serial bus connection 51 to device 30. Device 34 may have other request pins, the signals on which are encoded by additional pin encode controls.

Device 30 includes various controllers. For example, FIG. I shows device 30 to include an interrupt controller 41 and a DMA controller 42. Unserializer 43 unserializes packet information received by device 30 over serial bus connection 51. For example, packets indicating a transition of an interrupt request signal are received by pin emulate control 44. Pin emulate control 44 produces an emulated interrupt request signal and forwards the emulated interrupt request signal to interrupt controller 41. Edge transitions of the emulated interrupt request signal are based on the packets device 30 receives over serial bus connection 51.

Packets indicating a transition of an DMA request signal are received by pin emulate control 45. Pin emulate control 45 produces an emulated DMA request signal and forwards the emulated interrupt request signal to DMA controller 42. Edge transitions of the emulated DMA request signal are based on the packets device 30 receives over serial bus connection 51.

Figure 2:
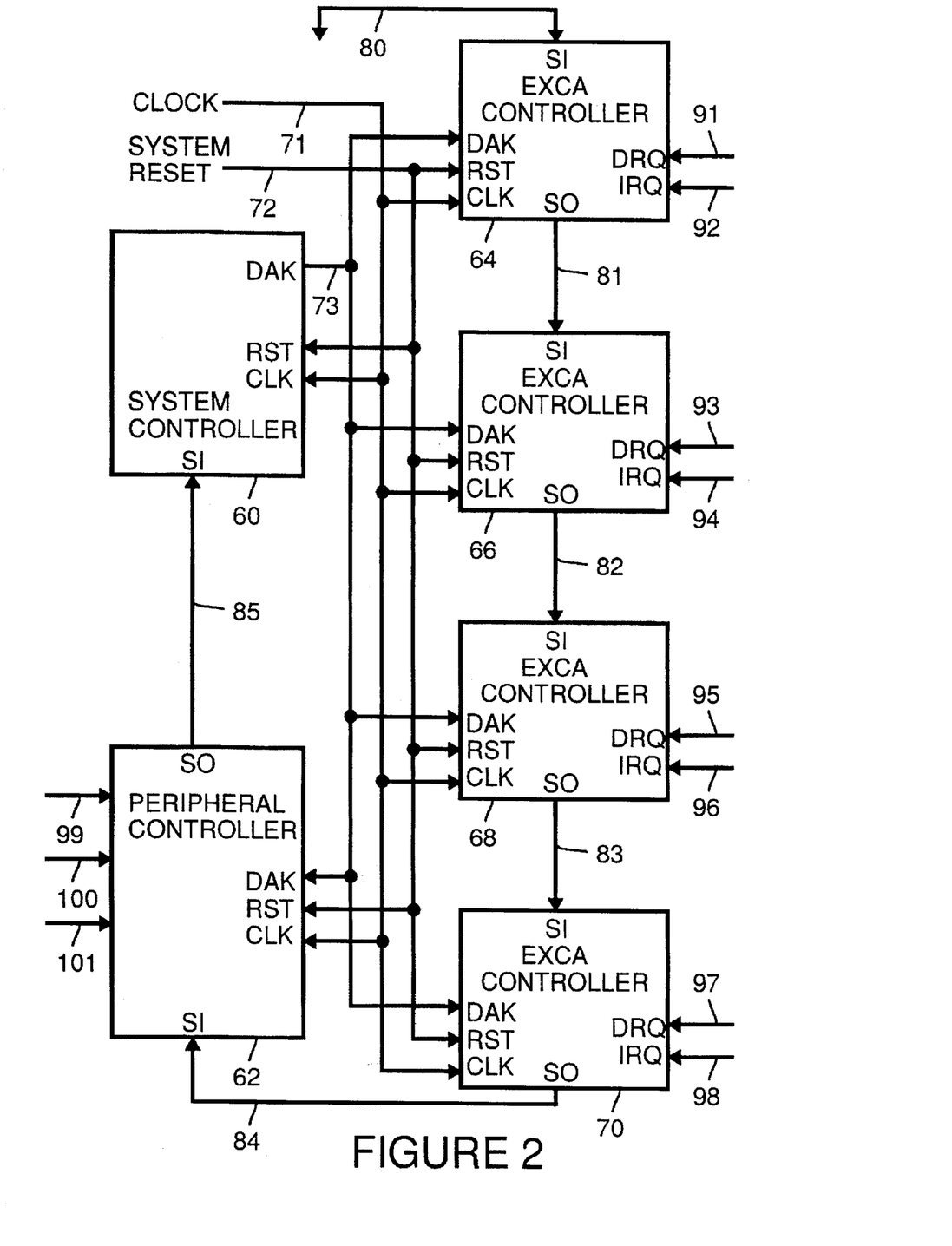
FIG. 2 shows a block diagram of a personal computer I/O system in which the rising and falling edges of interrupt and DMA request signals are detected and serialized in accordance with a preferred embodiment of the present invention.

FIG. 2 provides an example how the principles of the present invention are implemented in a specific system. In FIG. 2, a system controller 60, a peripheral controller 62, and four identical I/O devices 64, 66, 68 and 70 known as EXCA controllers are shown. Each of devices 60, 62, 64, 66, 68, and 70 has a clock input (CLK) which is connected to a common clock source 71. Each of devices 62, 64, 66, 68, and 70 has at least one dedicated acknowledgment signal (DAK) line connected to system controller 60. These DAK lines are collectively labeled as lines 73 on FIG. 2. System controller 60 makes an acknowledgment to a particular device by asserting an acknowledgment signal (DAK) on the DAK line from DAK lines 73 which is connected to the particular device.

In addition, each of devices 60, 62, 64, 66, 68, and 70 has a reset input (RST) which is connected to a common system reset signal 72. The configuration shown in FIG. 2 is used in an IBM-compatible notebook computer system. System controller 60 corresponds to a CPU chipset, which includes an internal interrupt controller (not shown) and an internal DMA controller (not shown). EXCA controllers 64, 66, 68 and 70 are expansion slots for peripherals such as random access memory (RAM), a modem, serial and parallel communication ports, etc.

Each peripheral connected to one of EXCA controllers 64, 66, 68 and 70 can signal the EXCA controller using programmable interrupt requests (IRQ) and DMA requests (DRQ). EXCA controller 64 receives DMA requests from a first peripheral on a DRQ pin 91 and receives IRQ interrupt requests from the first peripheral on an IRQ pin 92. EXCA controller 66 receives DMA requests from a second peripheral on a DRQ pin 93 and receives IRQ interrupt requests from the second peripheral on an IRQ pin 94. EXCA controller 68 receives DMA requests from a third peripheral on a DRQ pin 95 and receives IRQ interrupt requests from the third peripheral on an IRQ pin 96. EXCA controller 70 receives DMA requests from a fourth peripheral on a DRQ pin 97 and receives IRQ interrupt requests from the fourth peripheral on an IRQ pin 98.

Peripheral controller 62 is used to encode interrupt request (IRQ) information on IRQ pins 100 and DMA request (DRQ) information on DRQ pins 101 relating to an ISA bus 101, and to pass along serial data from EXCA controllers 64, 66, 68 and 70 to system controller 60.

The serial in port (SI) to EXCA controller 64 is connected to a ground 80, and thus held to a constant low logic state. The serial out port (SO) of EXCA controller 64 is connected through a serial bus connection 81 to the serial in port of EXCA controller 66. Likewise, the serial out port of EXCA controller 66 is connected through a serial bus connection 82 to the serial in port of EXCA controller 68, and the serial out port of EXCA controller 68 is connected through a serial bus connection 83 to the serial in port of EXCA controller 70. The serial out port of EXCA controller 70 is connected through a serial bus connection 84 to the serial in port of peripheral controller 62, and the serial out port of peripheral controller 62 is connected through a serial bus connection 85 to the serial in port of system controller 60. These serial bus connections 81 through 85 provide daisy-chain connections from one device to the next and together form a serial bus.

The serial bus interconnects the devices of FIG. 2 as shown, providing a data path for EXCA controllers 64, 66, 68 and 70, and peripheral controller 62, to communicate with system controller 60. In a typical notebook computer application, this serial bus provides a low pin count solution for providing programmable interrupt requests (IRQ) and DMA requests (DRQ) for the peripherals coupled to EXCA controllers 64, 66, 68 and 70. The serial bus also allows the interrupts and DMA requests from other ISA bus peripherals to be located remotely from the DMA controller and interrupt controller within system controller 60, by coupling the IRQ and DRQ lines from the ISA Bus to peripheral controller 62 as shown. The serial bus encodes system management interrupt (SMI), IRQ, and DRQ information in a six bit packet and transmits this information serially to peripheral controller 62. The serial bus protocol provides for daisy chaining multiple interrupt request and DMA request sources together on a single serial stream, further minimizing the pin overhead for IRQ and DRQ support. This scheme allows multiple I/O devices to use the same IRQ level or DRQ level without these sources directly driving the same IRQ or DRQ signals. The serial bus uses defined packets to transfer data. Each packet contains six bits of information that is equivalent to one signal in a typical ISA bus implementation. The packet can be either an interrupt request (IRQ), a DMA request (DRQ), an SMI request, or an EXCA controller number, as shown in Table 1 below.

TABLE 1

| Bit # | Bit Name | Description | |
|---|---|---|---|
| 0 | Start Bit | Serial Data Output is driven low to signify the beginning of packet transmission | |
| 2-1 | Packet Type | 00: First Packet after Reset: EXCA controller ID packet | |
| | | 00: After ID packet: INT Negative Edge packet | |
| | | 01: SMI Request Packet | |
| | | 10: INT Positive Edge or Pulse Request Packet | |
| | | 11: DMA Request Packet | |
| 6-3 | Packet ID | Packet Type [2:1] | Packet ID [6:3] |
| | | 00 (first) | First Packet after reset=EXCA ID # (0–15) |
| | | 00 (not first) | After EXCA ID packet = Negative Edge IRQ#(0–15) |
| | | 01 | SMI Request Number (0–15) |
| | | 10 | Positive Edge/Pulse IRQ#(0–15) |
| | | 11 | bits [5:3]=DRQ#(0–7) bit[6]=Positive Edge(0)/ Negative Edge(1) |
| 7 | Stop Bit (optional) | If no more packets are queued to be transmitted, the serial out port will be driven to a logic 1. Otherwise, this bit will be replaced by the start bit of the next packet. | |

The first bit is a start bit. The next two bits are a packet type field which identifies the type of data being sent. The four remaining bits are packet identification (ID), identifying the packet. Note that an optional stop bit is also included if the serial data bus is idle following the packet. The serial bus is a synchronous serial bus, with all packets transmitted synchronously to the clock from common clock source 71. Data changes on the rising edge of the clock from common clock source 71. Each device 62, 64, 66, 68 and 70 on the serial bus samples data presented to its serial in port on the falling edge of the clock from common clock source 71, and resynchronizes the incoming data stream before passing it on. This introduces one clock cycle of latency for each I/O device on the serial bus, but guarantees that the data stream will always be synchronous to the clock from common clock source 71, regardless of the number of devices on the serial bus.

Common clock source 71 can be provided from an external source as shown in FIG. 2, or may be generated in one of the serial bus devices and connected to the remaining devices. The clock from common clock source 71 is typically a 25 MHz square wave in this particular example, but there is no minimum clock frequency requirement. The clock from common clock source 71 can be any frequency providing the latency on the serial bus is not so great that reliable system operation is impaired.

For the DMA requests (DRQ), a packet with a Packet type 11 is used to indicate the edge information for the DMA requests or the interrupt requests. The first three bits [5:3] of the packet ID are used to indicate the DMA level. This is possible because in the preferred embodiment there are only eight DMA request levels which may be identified using bits [5:3]. The sixth bit of the Packet ID contains the edge information. A positive edge is indicated by a 0 and a negative edge is indicated by a 1.

For the interrupt requests (IRQ), all of bits [6:3] of the Packet ID are used to identify the interrupt level, therefore, a packet with a packet type 00 is used to indicate a negative edge in the interrupt request. A packet with a Packet type 10 is used to indicate a positive edge or a pulse in the interrupt request. A pulse is indicated when a second packet with packet type 10 is received without an intervening negative edge IRQ packet (Packet Type 00) being received.

The arbitration algorithm is as follows. The position of an I/O device in the daisy chain determines the priority of the I/O device. The higher an I/O device is on the daisy chain (i.e., the farther away from system controller 60), the higher the priority.

Start bits for each I/O device are always a modulo 7 number of clock cycles apart. This allows each device on the serial bus to determine when it is allowed to start transmission of a packet. Since the higher priority devices are placed higher in the chain, they will keep the serial bus busy when they require service, effectively locking out lower priority devices which are lower down the chain until the serial bus goes inactive. Since a stop bit only occurs if there is no packet immediately following the current packet, a stop bit signals the I/O device receiving it that the serial bus is available for it to transmit a packet, if needed. Given the one clock cycle latency for each I/O device caused by resynchronizing incoming data to the clock from common clock source 71, an I/O device can sense a stop bit, and begin transmitting its packet on the very next clock cycle.

To assure that the I/O devices remain synchronized to the clock from common clock source 71, each I/O device counts the number of successive ones received on its serial in port. When the count of ones exceeds six, the I/O device knows than an empty packet has just occurred, and the I/O device will synchronize itself to the next zero bit since it is, by definition, a start bit.

The serial bus can be used to transfer information regarding interrupt requests (including IRQ and SMI requests) and DMA requests from each EXCA controller, as well as configuring the EXCA controllers 64, 66, 68 and 70 to their respective assigned address spaces. The present invention relates to the serialization of IRQ, SMI and DRQ signals.

Figure 4:
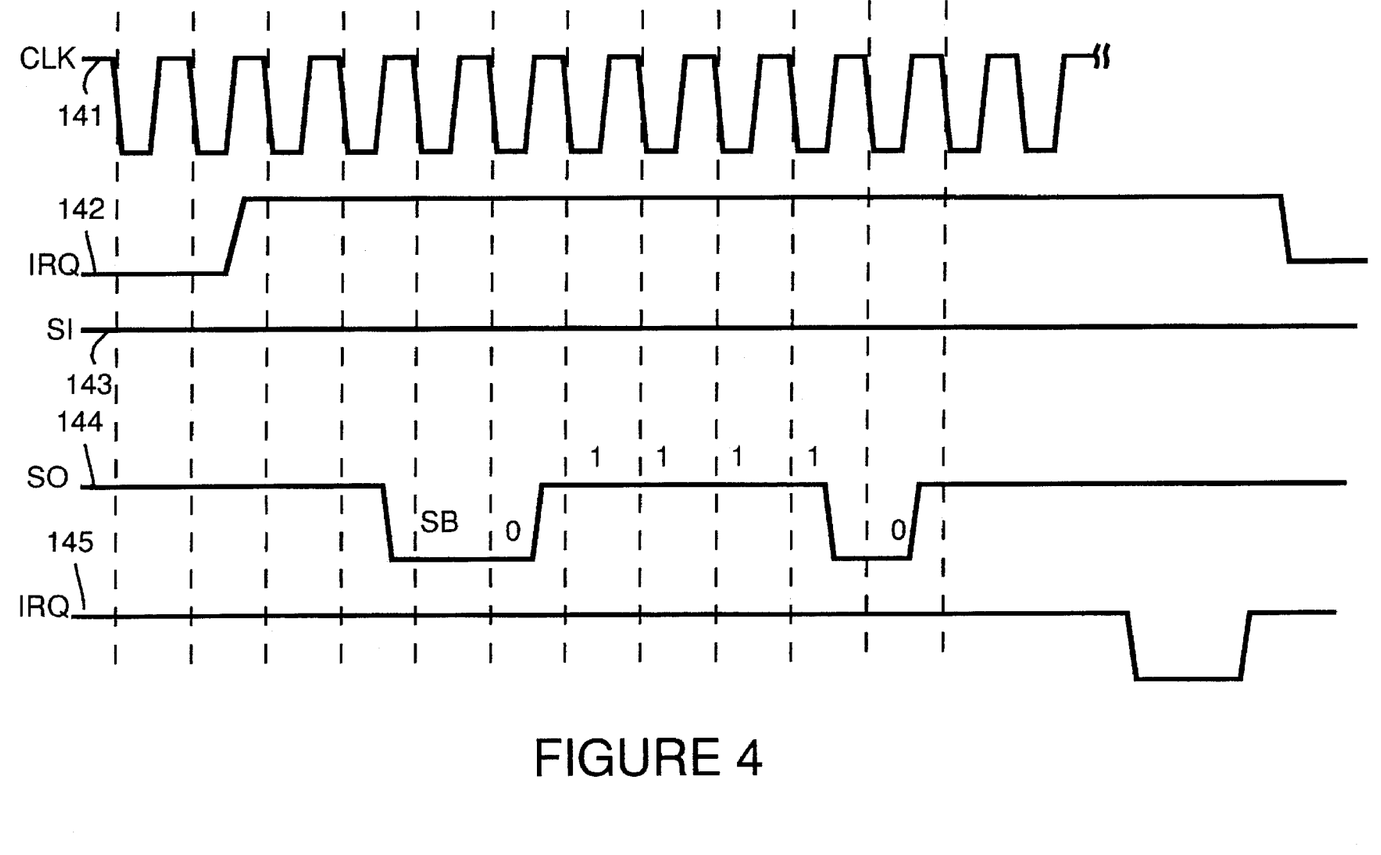
FIG. 4 is a timing diagram showing the timing sequence for serializing an interrupt request for the system of FIG. 2.
Figure 5:
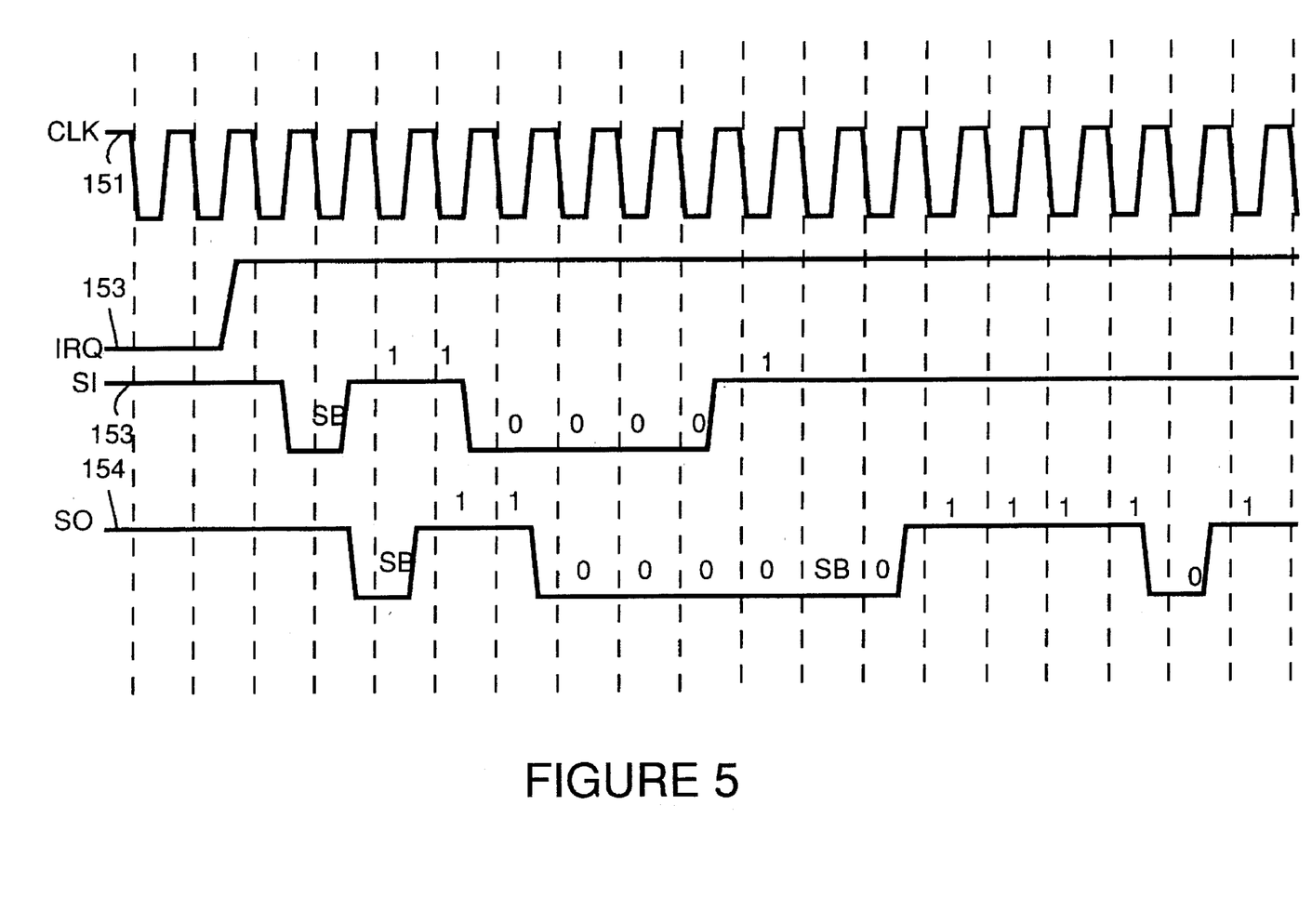
FIG. 5 is a timing diagram showing the timing sequence for serializing an interrupt request for the system of FIG. 2 when the serial bus is busy with a D/VIA request.

An EXCA controller transmits Packet Type 01 when it requires SMI service from system controller 60, transmits Packet Type 60 when it requires Interrupt Request service from system controller 60, and transmits a Packet Type 11 when it requires service from the DMA controller within system controller 60. Packet type 00, is used to configure the EXCA controllers 64, 66, 68 and 70 upon system reset or power-up. After start-up, the Packet type 00 is used to indicate an IRQ negative edge. The operation of the system as shown in FIGS. 3 through 5 assumes that the system has been reset, and that the EXCA controllers 64, 66, 68 and 70 have all been configured to their unique address spaces.

Figure 3:
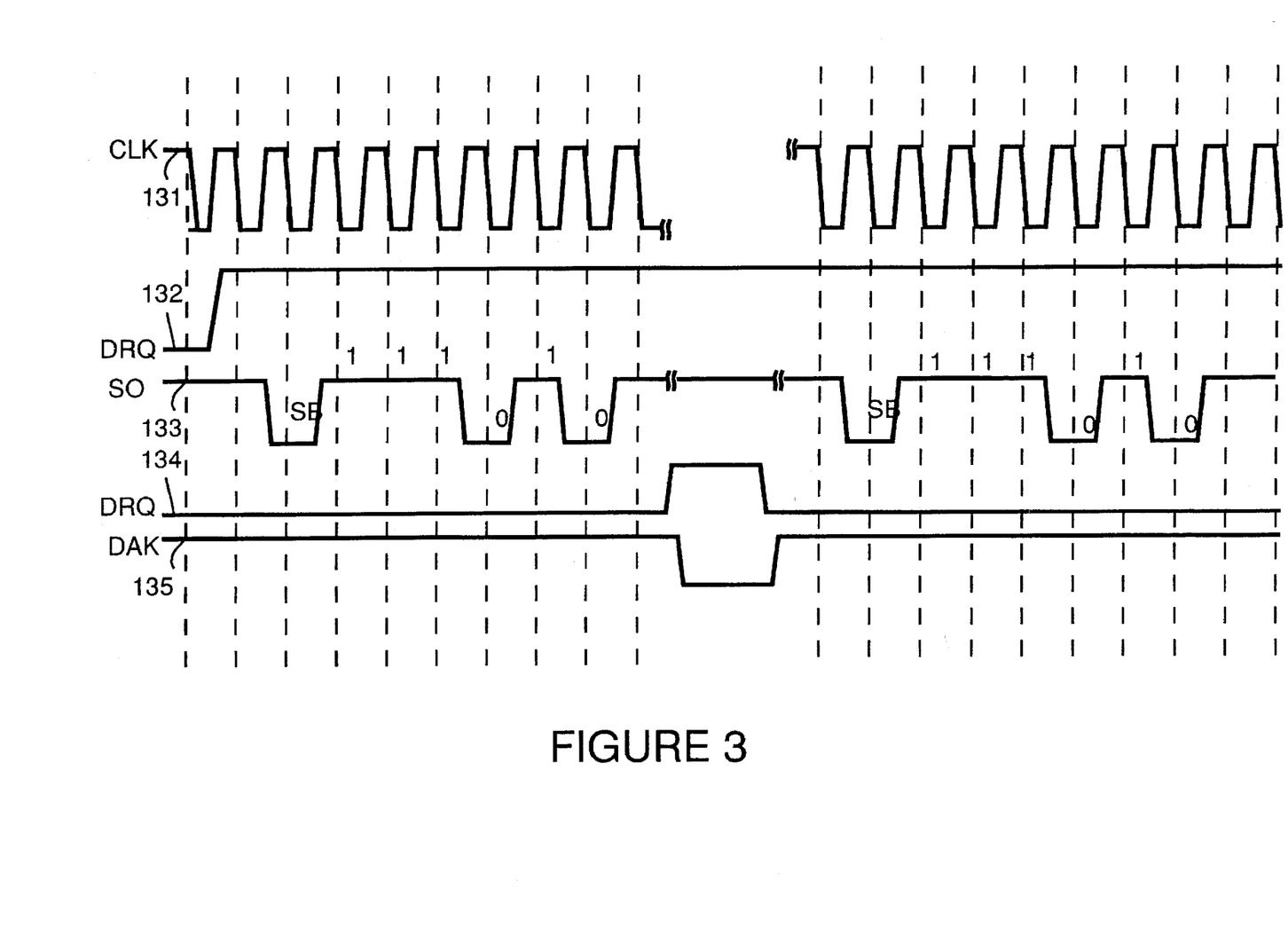
FIG. 3 is a timing diagram showing the timing sequence for serializing a DMA request for the system of FIG. 2.

The timing of the serialization of a typical DMA Request for the system of FIG. 2 is shown in FIG. 3. This particular example assumes that the first peripheral, which is connected to EXCA controller 64 (see FIG. 2), desires to assert a level five DRQ signal within the system controller when the first peripheral asserts the DRQ input pin 91 of EXCA controller 64. The DRQ signal on input pin 91 is represented by waveform 132 in FIG. 3. The level five DRQ signal within the system controller is represented by waveform 134 in FIG. 3. Common clock source 71 is represented by waveform 131.

When the first peripheral asserts the DRQ signal to EXCA controller 64, EXCA controller 64 outputs a serial packet on its serial out port that has a Packet Type of 11 (indicating a DMA Request Packet) and a Packet ID of 0601 (indicating that level five DRQ requires service). The signal on the serial out port of EXCA controller 64 is represented by waveform 133. After this packet travels through EXCA controllers 66, 68 and 70, and through peripheral controller 62, it reaches system controller 60, which decodes the packet and asserts the level five DRQ signal to its internal DMA controller.

The DMA controller within system controller 60 acknowledges the assertion of the DRQ signal within the system controller by asserting a level five DAK signal. The level 5 DAK is represented by waveform 135. The DAK input to each EXCA controller 64, 66, 68 and 70 are internally ANDed with the DRQ input for each EXCA controller, and the EXCA controller 64 will thus generate a DMA Request Packet each time it sees a low to high transition on the output of this AND gate. In this manner, if level five DAK is high as shown in FIG. 3 when the first peripheral asserts the DRQ signal on DRQ pin 91, the output of the internal AND gate within EXCA controller 64 goes from low to high, and EXCA controller 64 therefore generates a DMA Request Packet. This scheme results in a DMA Request Packet being generated when DRQ goes active when DAK is already high, or when DAK goes inactive with DRQ still active. This causes demand mode DMA devices to essentially issue multiple DMA requests instead of issuing one long, continuous request. System controller 60 asserts the appropriate DRQ lines to its internal DMA controller whenever a DMA Request Packet is received, and negates it when the appropriate DAK level is generated. Since the four bits of data within the DMA Request Packet provide for sixteen levels of DRQs, but the system of FIG. 2 typically only has eight levels of DRQs, the most significant bit of the Packet ID field is always zero for a DMA Request Packet.

The timing of the serialization of an Interrupt Request is shown in FIG. 4. The second peripheral is selected for this specific example, and it is assumed that the second peripheral, which is coupled to EXCA controller 66, requires service from level seven IRQ when the second peripheral asserts the IRQ input of EXCA controller 66. The IRQ signal on input pin 94 is represented by waveform 142 in FIG. 4. The level seven IRQ signal within the system controller is represented by waveform 145 in FIG. 4. Common clock source 71 is represented by waveform 141.

When the second peripheral asserts the IRQ signal to EXCA controller 66, EXCA controller 66 outputs a serial packet on its serial out port that has a Packet Type of 60 (indicating an LRQ Request Packet) and a Packet ID of 0111 (indicating that level seven IRQ requires service). Note that EXCA controller 66 can only transmit this IRQ Request Packet when its serial in port is idle. The signal on the serial out port of EXCA controller 66 is represented by waveform 144. The signal on the serial in port of EXCA controller 66 is represented by waveform 143. EXCA controller 66 knows the serial in port is idle when this input shows a stop bit (is high) during one of the modulo 7 start times for EXCA controller 66. In FIG. 4, the serial in port of EXCA controller 66 is always high, so EXCA controller 66 can transmit the IRQ Request Packet immediately on the next packet, as soon as the modulo 7 start bit time occurs.

After this IRQ Request Packet travels through EXCA controllers 68 and 70, and through peripheral controller 62, it reaches system controller 60, which decodes the packet and asserts the level seven IRQ signal to its internal Interrupt controller.

An SMI Request Packet is handled in the exact same way as the Interrupt Request Packet just described, since an SMI is, in fact, a special type of interrupt. If FIG. 4 were modified so the IRQ label was replaced by an SMI label instead, this would accurately reflect the operation of the serial bus during an SMI Request Packet, as described above in relation to the IRQ Request Packet.

The operation of the data bus of FIG. 2 includes inherent latency in serializing and shifting the required data packets to system controller 60. This latency can increase when different EXCA controllers require use of the serial bus at the same time, as shown in FIG. 5. In this example, the second peripheral asserts the IRQ input on input pin 94 of EXCA controller 66, which corresponds to level seven IRQ. The IRQ signal on input pin 94 is represented by waveform 152 in FIG. 4. Common clock source 71 is represented by waveform 151. EXCA controller 66 would like to send an IRQ Request Packet on the next modulo 7 start bit, but during the next start bit the serial in port is active with a level five DRQ request from the first peripheral. The signal on the serial out port of EXCA controller 66 is represented by waveform 154. The signal on the serial in port of EXCA controller 66 is represented by waveform 153. An 11 in the Packet Type field identifies this packet as a DMA Request Packet, and 0601 in the Packet ID field identifies this DMA Request as a level five DRQ. EXCA controller 66 must therefore wait until its serial in port goes inactive by showing a stop bit. Once the stop bit is seen, EXCA controller 66 can output the Interrupt Request Packet on the very next packet, thereby minimizing latency.

The latency of the serial bus can impair system performance if it becomes too long. For this reason the IRQ and DRQ information is binary encoded in the Packet Type field and the Packet ID field to reduce the number of bits required to communicate all the needed IRQ and DRQ signals. The maximum latency for a single packet in the system of FIG. 2 occurs for EXCA controller 64, and is as follows:

seven clocks before the start bit location
seven clocks to transmit the packet
one clock latency for each of the three other EXCA controllers 66, 68, and 70
one clock latency for the peripheral controller 62.

This results in a total of 68 clock cycles of latency. At 25 MHz, the total latency is therefore 770 nanoseconds. If two packets occur simultaneously, the worst case latency is increased by seven additional clock cycles while the first packet is transmitted, resulting in a total latency of 25 clock cycles. At 25 MHz, the worst-case latency is therefore 1 microsecond. For each additional packet that occurs simultaneously, add an additional 250 nanoseconds of latency. Note that the prior art implementation of this type of serial bus found in the VL82C480 chipset had a packet wherein each IRQ and DRQ had a separate bit. The IBM PC-AT computer has fifteen different IRQ inputs, seven different DRQ inputs, and one SMI interrupt. So the prior art implementation of the VL82C480 chip set required a 26 bit serial bus packet since the data was not encoded. By encoding the data, this number is reduced from 24 bit packets to 7 bit packets, which greatly reduces the latency of the serial bus.

Figure 6:
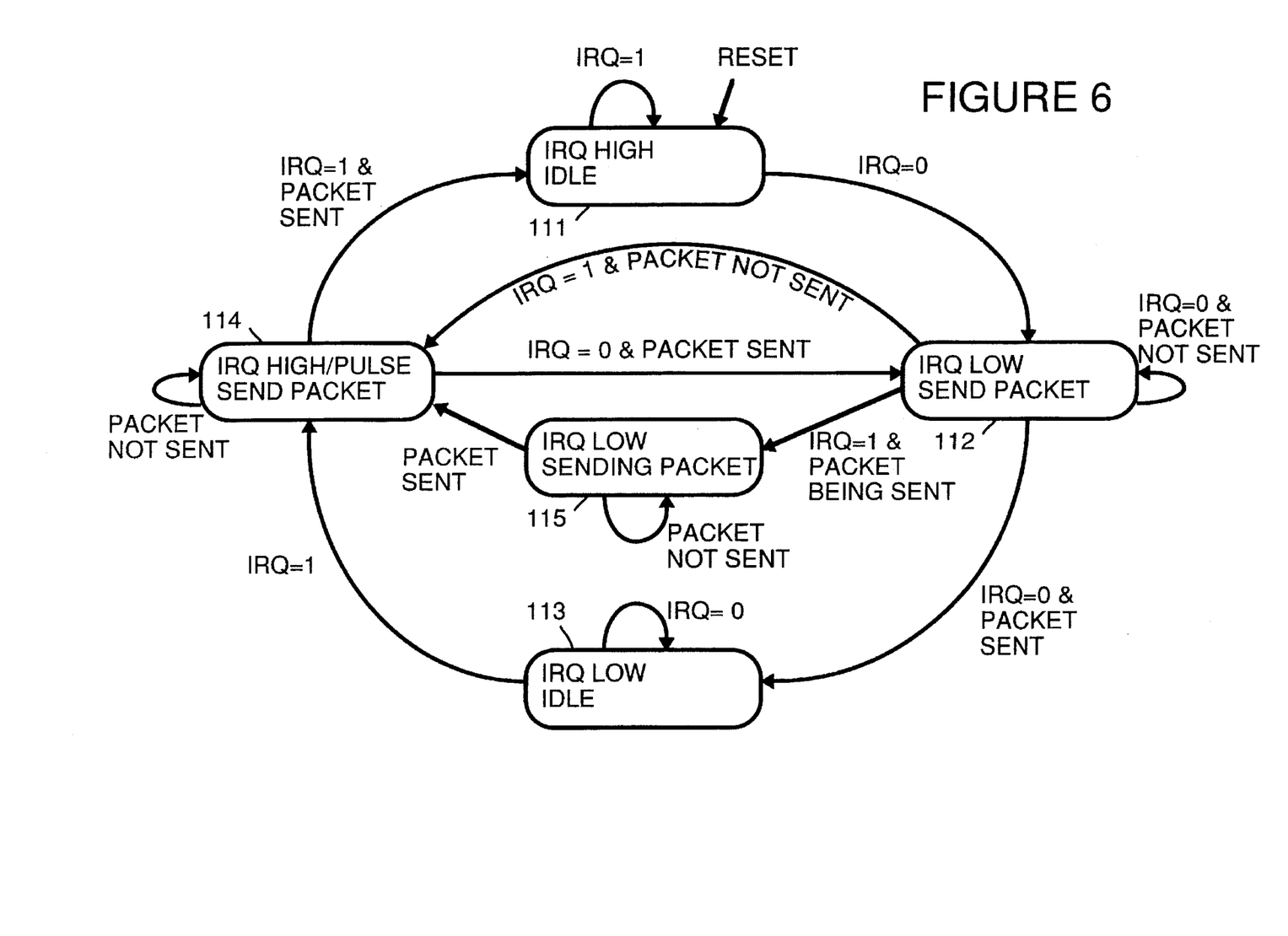
FIG. 6 shows a state diagram for the encoding of interrupt requests in accordance with a preferred embodiment of the present invention.

FIG. 6 shows a state diagram for an IRQ interrupt state machine within the pin encode control within one of devices 62, 64, 66, 68 and 70. Upon reset, the IRQ interrupt state machine is in an IRQ high idle state 111. The IRQ interrupt state machine remains in the IRQ high idle state 111 as long as the signal at the relevant IRQ pin is at logic one. When the signal at the IRQ pin transitions to logic zero, the IRQ interrupt state machine enters an IRQ low send packet state 112. In IRQ low send packet state 112, an ID packet (packet type 00) is sent indicating an IRQ negative edge. The IRQ interrupt state machine remains in IRQ low send packet state 112 as long as the signal at the relevant IRQ pin is at logic zero and the ID packet is being sent. When the packet is sent, as long as the IRQ pin has remained at logic zero, the IRQ interrupt state machine transitions to an IRQ low idle state 113.

The IRQ interrupt state machine remains in IRQ low idle state 113 as long as the signal at the relevant IRQ pin is at logic zero. When the signal at the IRQ pin transitions to logic one, the IRQ interrupt state machine enters an IRQ high/pulse send packet state 114. In IRQ high send packet state 114, an interrupt positive edge packet (packet type 10) is sent indicating an IRQ positive edge. The IRQ interrupt state machine remains in IRQ high/pulse send packet state 114 until the packet is sent. When the packet is sent, if the IRQ pin has remained at logic one, the IRQ interrupt state machine transitions to IRQ high idle state 111. When the packet is sent, if the IRQ pin has transitioned to logic zero, the IRQ interrupt state machine transitions to IRQ low send packet state 112.

When in IRQ low send packet state 112, if the IRQ pin transitions to logic 1 while the ID packet is being sent, the IRQ interrupt state machine transitions to an IRQ low sending packet state 115. In IRQ low sending packet state 115, the sending of the ID packet (packet type 00) continues until the packet is sent. When the ID packet (packet type 00) has been sent, the IRQ interrupt state machine transitions to IRQ high/pulse send packet state 114.

When in IRQ low send packet state 112, if the IRQ pin transitions to logic I before beginning to send the ID packet, this is a pulse condition in which sending of the ID packet (packet type 00) is abandoned. Instead of sending the package, the IRQ interrupt state machine immediately transitions to IRQ high/pulse send packet state 114.

Figure 7:
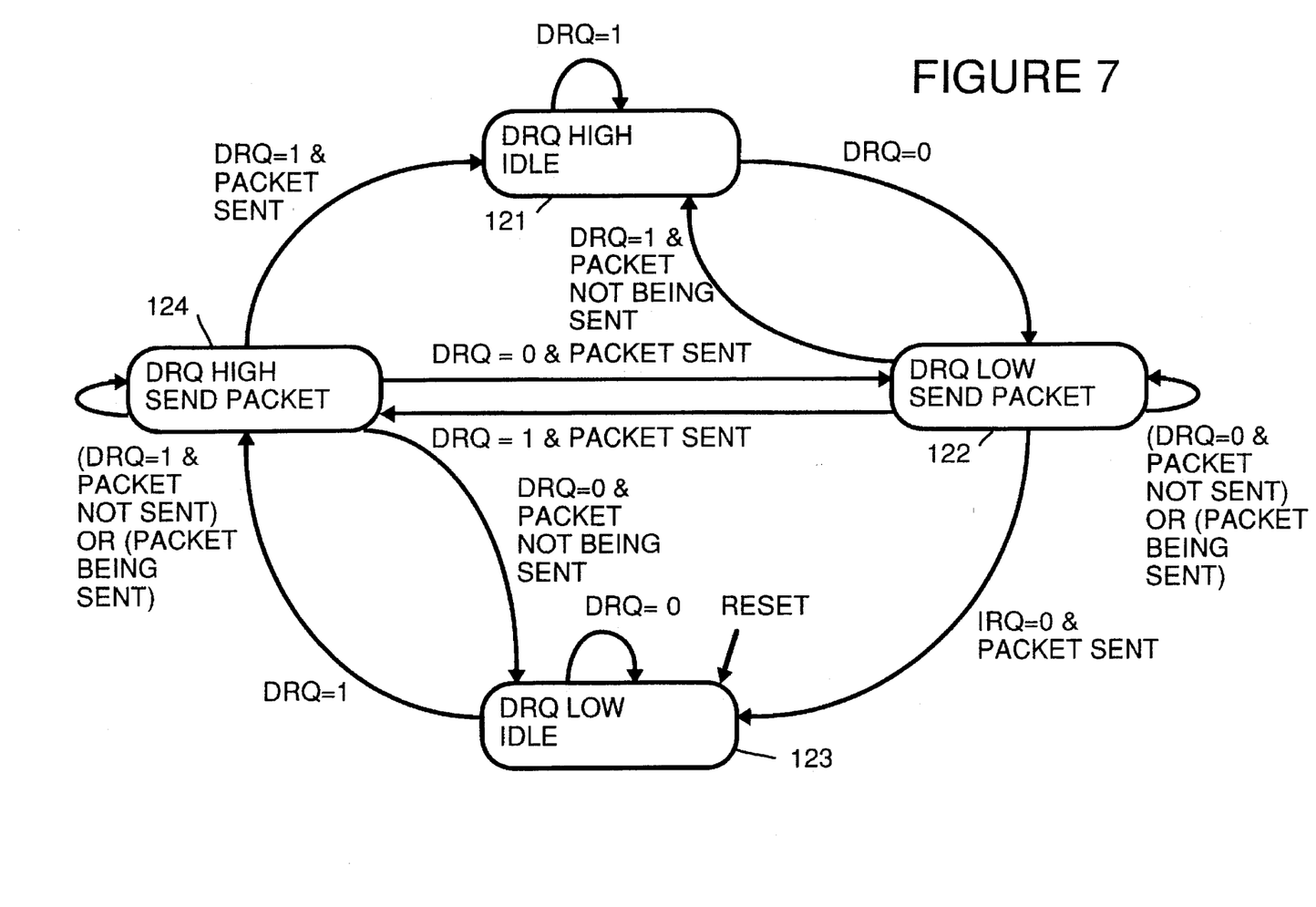
FIG. 7 shows a state diagram for the encoding of DMA requests in accordance with a preferred embodiment of the present invention.

FIG. 7 shows a state diagram for a DRQ interrupt state machine within the encoding of interrupt requests by a pin encode control within one of devices 62, 64, 66, 68 and 70. Upon reset, the DRQ interrupt state machine is in a DRQ low idle state 123. The DRQ interrupt state machine remains in DRQ low idle state 123 as long as the signal at the relevant DRQ pin is at logic zero. When the signal at the DRQ pin transitions to logic one, the DRQ interrupt state machine enters a DRQ high send packet state 124. In DRQ high send packet state 124, a positive DMA request packet (bit [6]=0) is sent indicating a DRQ positive edge. The DRQ interrupt state machine remains in DRQ high send packet state 124 while DRQ equals logic one and the packet is not sent. Once sending the packet has commenced, The DRQ interrupt state machine remains in DRQ high send packet state 124 until the packet is sent. In DRQ high send packet state 124, when the packet is sent, if the DRQ pin has remained at logic one, the DRQ interrupt state machine transitions to a DRQ high idle state 121. In DRQ high send packet state 124, when the packet is sent, if the DRQ pin has transitioned to logic zero, the DRQ interrupt state machine transitions to a DRQ low send packet state 122. In DRQ high send packet state 124, if the DRQ pin has transitioned to logic zero before sending the packet has commenced, the DRQ interrupt state machine returns to DRQ low idle state 123.

Once in DRQ high idle state 121, the DRQ interrupt state machine remains in DRQ high idle state 121 as long as the signal at the relevant DRQ pin is at logic one. When the signal at the DRQ pin transitions to logic zero, the DRQ interrupt state machine enters a DRQ low send packet state 122. In DRQ low send packet state 122, a negative DMA request packet (bit [6]=1) is sent indicating a DRQ negative edge. The DRQ interrupt state machine remains in DRQ low send packet state 124 while DRQ equals logic zero and the packet is not sent. Once sending the packet has commenced, The DRQ interrupt state machine remains in DRQ low send packet state 122 until the packet is sent. In DRQ low send packet state 122, when the packet is sent, if the DRQ pin has remained at logic zero, the DRQ interrupt state machine transitions to DRQ low idle state 123. In DRQ low send packet state 122, when the packet is sent, if the DRQ pin has transitioned to logic one, the DRQ interrupt state machine transitions to DRQ high send packet state 124. In DRQ low send packet state 122, if the DRQ pin has transitioned to logic one before sending the packet has commenced, the DRQ interrupt state machine returns to DRQ high idle state 121.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for emulating request signals comprising the steps of:

(a) when a first peripheral device asserts a first request signal on a first request pin of a first I/O device, performing the following substeps (a.1) generating, by a serializer coupled to the first request pin, a first type of packet, the serializer forwarding the first type of packet to a serial out port of the first I/O device, (a.2) forwarding the first type of packet, by the serial out port of the first I/O device, to a serial in port of a controller device, and (a.3) upon the serial in port receiving the first type of packet, asserting, by an unserializer within the request controller, an emulated first request signal, the emulated first request signal being coupled to a first request controller within the controller device;

(b) when the first peripheral device de-asserts the first request signal on the first request pin of the first I/O device, performing the following substeps (b.1) generating, by the serializer coupled to the first request pin, a second type of packet, the serializer forwarding the second type of packet to the serial out port of the first I/O device, (b.2) forwarding the second type of packet, by the serial out port of the first I/O device, to the serial in port of the controller device, and (b.3) upon the serial in port receiving the second type of packet, de-asserting, by the unserializer within the request controller, the emulated first request signal; and, (c) when the first peripheral device pulses the first request signal by quickly de-asserting and asserting the first request signal in quick succession, performing substeps (a.1), (a.2) and (a.3) but not performing substeps (b.1), (b.2) and (b.3).

2. A computing system comprising:

a first peripheral device;

a first I/O device, the first device including a first request pin coupled to the first peripheral device, a serial out port, and a serializer, coupled to the first request pin and to the serial out port, the serializer forwarding a first packet to the serial out port when the first peripheral device asserts a first request signal on the first request pin, and the serializer forwarding a second packet to the serial out port when the first peripheral device de-asserts the first request signal on the first request pin; and, a controller device, including a first request controller, a serial in port coupled to the serial out port of the first I/O device, the first packet and the second packet being forwarded from the serial out port of the first I/O device to the serial in port, and an unserializer coupled to the first request controller and to the serial in port, the unserializer asserting an emulated first request signal coupled to the first request controller upon receiving from the serial in port the first packet, and the unserializer de-asserting the emulated first request signal coupled to the first request controller upon receiving from the serial in port the second packet.

3. A computing system as in claim 2 wherein:

the first I/O device additionally includes a second request pin coupled to the first peripheral device;

the serializer forwards a third packet to the serial out port when the first peripheral device asserts a second request signal on the second request pin, and the serializer forwards a fourth packet to the serial out port when the first peripheral device de-asserts the second request signal on the second request pin;

the controller device includes a second request controller; and, the unserializer asserts an emulated second request signal coupled to the second request controller upon receiving from the serial in port the third packet and the unserializer de-asserts the emulated second request signal coupled to the second request controller upon receiving from the serial in port the fourth packet.

4. A computing system as in claim 3 wherein the first request signal is a DMA request signal, the second request signal is an interrupt request signal, the first request controller is a DMA controller and the second request controller is an interrupt controller.

5. A computing system as in claim 4 wherein the first packet and the second packet each includes information identifying a DMA request level, and a DMA request signal edge direction; and, the third packet and the fourth packet each includes information identifying an interrupt request level, and an interrupt request signal edge direction.

6. A computing system as in claim 2 wherein the first request signal is a DMA request signal and the first request controller is a DMA controller.

7. A computing system as in claim 6 wherein the first packet and the second packet each includes information identifying a DMA request level, and a DMA request signal edge direction.

8. A computing system as in claim 2:

wherein the computing system additionally comprises:

a second peripheral device, and a second I/O device, the second device including a second request pin coupled to the second peripheral device, a serial in port, a serial out port, and a serializer, coupled to the second request pin and to the serial out port of the second I/O device, the serializer of the second I/O device forwarding a third packet to the serial out port of the second I/O device when the second peripheral device asserts a second request signal on the second request pin, and the serializer of the second I/O device forwarding a fourth packet to the serial out port of the second I/O device when the second peripheral device de-asserts the second request signal on the second request pin;

wherein the first I/O device additionally comprises a serial in port coupled to the serial out port of the second I/O device, the first I/O device passing the third packet and the fourth packet from the serial in port of the first I/O device to the serial out port of the first I/O device; and wherein the unserializer within the controller device additionally asserts an emulated second request signal coupled to the first request controller upon receiving from the serial in port the third packet, and the unserializer de-asserts the emulated second request signal coupled to the first request controller upon receiving from the serial in port the fourth packet.

9. A method for emulating request signals comprising the steps off (a) when a first peripheral device asserts a first request signal on a first request pin of a first I/O device, performing the following substeps (a.1) generating, by a serializer coupled to the first request pin, a first packet, the serializer forwarding the first packet to a serial out port of the first I/O device, (a.2) forwarding the first packet, by the serial out port of the first I/O device, to a serial in port of a controller device, and (a.3) upon the serial in port receiving the first packet, asserting, by an unserializer within the request controller, an emulated first request signal, the emulated first request signal being coupled to a first request controller within the controller device; and, (b) when the first peripheral device de-asserts the first request signal on the first request pin of the first I/O device, performing the following substeps
 (b.1) generating, by the serializer coupled to the first request pin, a second packet, the serializer forwarding the second packet to the serial out port of the first I/0 device,
 (b.2) forwarding the second packet, by the serial out port of the first I/O device, to the serial in port of the controller device, and
 (b.3) upon the serial in port receiving the second packet, deasserting, by the unserializer within the request controller, the emulated first request signal.

10. A method as in claim 9 additionally comprising the following steps:
 (c) when the first peripheral device asserts a second request signal on a second request pin of the first I/O device, performing the following substeps
  (c.1) generating, by the serializer, a third packet, the serializer forwarding the third packet to the serial out port of the first I/O device,
  (c.2) forwarding the third packet, by the serial out port of the first I/O device, to the serial in port of the controller device, and
  (c.3) upon the serial in port receiving the third packet, asserting, by the unserializer within the request controller, an emulated second request signal, the emulated second request signal being coupled to a second request controller within the controller device; and,
 (d) when the first peripheral device de-asserts the second request signal on the second request pin of the first I/O device, performing the following substeps
  (d.1) generating, by the serializer coupled to the second request pin, a fourth packet, the serializer forwarding the fourth packet to the serial out port of the first I/O device,
  (d.2) forwarding the fourth packet, by the serial out port of the first I/O device, to the serial in port of the controller device, and
  (d.3) upon the serial in port receiving the fourth packet, deasserting, by the unserializer within the request controller, the emulated second request signal.

11. A method as in claim 10 wherein in steps (a) and (b) the first request signal is a DMA request signal and the first request controller is a DMA controller, and in steps (c) and (d) the second request signal is an interrupt request signal and the second request controller is an interrupt controller.

12. A method as in claim 10 wherein:
in steps (a) and (b) the first packet and the second packet each includes information identifying a DMA request level, and a DMA request signal edge direction; and,
in steps (c) and (d) the third packet and the fourth packet each includes information identifying an interrupt request level, and an interrupt request signal edge direction.

13. A method as in claim 9 wherein in steps (a) and (b) the first request signal is a DMA request signal and the first request controller is a DMA controller.

14. A method as in claim 13 wherein in steps (a) and (b) the first packet and the second packet each includes information identifying a DMA request level, and a DMA request signal edge direction.

15. A method as in claim 9 additionally comprising the following steps:
 (c) when a second peripheral device asserts a second request signal on a second request pin of a second I/O device, performing the following substeps
  (c.1) generating, by a serializer coupled to the second request pin, a third packet, the serializer forwarding the third packet to a serial out port of the second I/O device,
  (c.2) forwarding the third packet, by the serial out port of the second I/O device, through the first I/O device to the serial in port of the controller device, and
  (c.3) upon the serial in port of the controller device receiving the third packet, asserting, by the unserializer within the request controller, an emulated second request signal, the emulated second request signal being coupled to the request controller within the controller device; and,
 (d) when the second peripheral device de-asserts the second request signal on the second request pin of the second I/O device, performing the following substeps
  (d.1) generating, by the serializer coupled to the second request pin, a fourth packet, the serializer forwarding the fourth packet to the serial out port of the second I/O device,
  (d.2) forwarding the fourth packet, by the serial out port of the second I/O device, through the first I/O device to the serial in port of the controller device, and
  (d.3) upon the serial in port of the controller device receiving the fourth packet, de-asserting, by the unserializer within the request controller, the emulated second request signal.

16. A computing system comprising:
a serial bus comprising a plurality of serial bus connections;
a first plurality of I/O devices arranged in a daisy chain and coupled together by the serial bus connections, each I/O device including
 a first request pin coupled to a peripheral device,
 a serial out port coupled to a serial bus connection from the plurality of serial bus corrections,
 a serial in port coupled to a serial bus connection from the plurality of serial bus connections, and
 a serializer, coupled to the first request pin and to the serial out port, the serializer forwarding a first packet to the serial out port when the peripheral device asserts a first request signal on the first request pin, and the serializer forwarding a second packet to the serial out port when the peripheral device de-asserts the first request signal on the first request pin; and,
a controller device, including
 a first request controller,
 a serial in port coupled to a serial bus connection from the plurality of serial bus connections, for receiving the first packet and the second packet from each of the I/O devices, and
 an unserializer coupled to the first request controller and to the serial in port,
  the unserializer asserting an emulated first request signal coupled to the first request controller upon receiving from the serial in port the first packet, and
  the unserializer de-asserting the emulated first request signal coupled to the first request controller upon receiving from the serial in port the second packet.

* * * * *